United States Patent
Russ et al.

[11] Patent Number: 5,911,788
[45] Date of Patent: Jun. 15, 1999

[54] COMPLIANT GEAR

[75] Inventors: David E. Russ; David C. Quick, both of Rockford, Ill.; Douglas J. Esposito, Tempe, Ariz.

[73] Assignee: Sundstrand Corporation, Rockford, Ill.

[21] Appl. No.: 09/026,933

[22] Filed: Feb. 20, 1998

[51] Int. Cl.⁶ .......................... F16H 55/14; F16H 55/12
[52] U.S. Cl. ............................... 74/411; 74/461; 74/447
[58] Field of Search .......................... 74/411, 461, 446, 74/447

[56] References Cited

U.S. PATENT DOCUMENTS

| | | | |
|---|---|---|---|
| 2,749,778 | 6/1956 | Kuhn | 74/411 X |
| 4,149,431 | 4/1979 | Rouverol | 74/462 |
| 4,674,351 | 6/1987 | Byrd | 74/443 |
| 4,831,897 | 5/1989 | Dobbs | 74/411 |
| 5,117,704 | 6/1992 | Kish et al. | 74/411 |
| 5,170,676 | 12/1992 | Matouks et al. | 74/411 |

*Primary Examiner*—Allan D. Herrmann
*Attorney, Agent, or Firm*—Wood, Phillips, VanSanten, Clark & Mortimer

[57] ABSTRACT

A radially compliant gear is provided to reduce transmitted shock loads and/or resist jamming as a result of debris entering its mesh with another gear. The radially compliant gear includes a hub adapted to rotate about an axis, and a compliant rim. The hub includes a first surface that faces radially inwardly. The rim includes external gear teeth and a second surface that faces radially outwardly. The rim is mounted to the hub through the first and second surfaces to allow localized radial deflections of the rim relative to the hub. The first and second surfaces are configured to provide a predetermined minimum radial preload between the rim and the hub.

25 Claims, 3 Drawing Sheets

COMPLIANT GEAR

FIELD OF THE INVENTION

This invention relates to mechanical power transmission devices, and more particularly, to gears and gear trains.

BACKGROUND OF THE INVENTION

It is common for certain mechanical power transmission devices to employ gear trains and to require especially high reliability to ensure that the device will operate on demand. For example, certain aircraft actuators and actuator systems employ gear trains and require especially high reliability to ensure the operability of the aircraft during all flight modes. A failure, such as a jam, in the gear train of such aircraft actuators and actuator systems is therefore to be avoided. For gear trains, failures, such as jamming, can occur when debris, such as pieces of a bearing cage or a broken or bent gear tooth, enters a gear mesh between two gears.

One approach to obtaining high reliability is to provide the mechanical power transmission device with a high degree of redundancy via multiple load paths between the input and output of the device. Such an approach provides alternate load paths in the event of a failure, such as a jam, in any one of the multiple load paths. However, there are often locations in such devices, such as at a single output member driven by the multiple load paths, where a jam in one of the multiple load paths may prevent operation of the entire device. Additionally, multiple load paths are not feasible in some mechanical power transmission devices due to other requirements and constraints, such as weight or envelope, on the device. The ability to resist a jam can become even more important in such devices.

Thus, it can be seen there is a need for a new and improved mechanical power transmission device that includes a jam-resistant gear or gear train which will allow for the continued operation of the device when debris enters a mesh of the gear or gear train.

Shock loads caused by rapid accelerations and decelerations are another problem encountered by many mechanical power transmission devices, such as aircraft actuators and actuator systems. Often, the anticipated shock loads, rather than the normal operating loads, determine the component sizing for the device. This can result in components that are oversized for their normal operating loads. Accordingly, there is a continuing need for mechanical power transmission devices that minimize the transmitted shock loads, thereby increasing the shock load tolerance of the device and reducing the size and weight of the device.

SUMMARY OF THE INVENTION

It is the principal object of the invention to provide a new and improved gear for use in a mechanical power transmission device. More specifically, it is an object of the invention to provide a gear that is resistant to jamming caused by debris entering its mesh with another gear. It is another object of the invention to provide a gear that reduces the shock loads transmitted through a mechanical power transmission device.

An exemplary embodiment of the invention achieves the foregoing objects in a radially compliant gear including a hub adapted to rotate about an axis, and a compliant rim. The hub includes a first surface that faces radially inwardly. The rim includes external gear teeth and a second surface that faces radially outwardly. The rim is mounted to the hub through the first and second surfaces to allow localized radial deflections of the rim relative to the hub. The first and second surfaces are configured to provide a predetermined minimum radial preload between the rim and the hub.

In one form, the second surface has an interference fit with the first surface to provide the predetermined minimum radial preload between the rim and the hub.

In one form, the first and second surfaces are cylindrical surfaces.

In another form, the first and second surfaces are conical surfaces.

In one form of the invention, a radially compliant gear is provided and includes a rim including external gear teeth, and first and second hub pieces spaced from each other on opposite sides of the rim to mount the rim for rotation about an axis. A portion of each of the hub pieces radially overlays a corresponding portion of the rim to restrict radially outward movement of the rim.

In one form of the invention, a radially compliant gear is provided that includes a hub adapted to rotate about an axis, and a rim including gear teeth. The hub includes at least three pairs of guide surfaces spaced angularly from each other relative to the axis. The guide surfaces of each pair extend parallel to an imaginary radial line extending outward from the axis. The rim includes at least three pairs of mating surfaces spaced angularly from each other about the axis. The mating surfaces of each pair extend parallel to an imaginary radial line extending outward from the axis. The mating surfaces engage the guide surfaces to radially locate and mount the rim to the hub for rotation about the axis and to transmit torque between the rim and the hub while allowing localized radial deflections of the rim relative to the hub.

In one form of the invention, a radially compliant gear is provided that includes a gear rim having radially outwardly directed teeth, and a hub rotatable about an axis and mounting the gear rim for both relative angular movement and relative radial movement thereon. First structure is provided on the hub and the ring for limiting relative angular movement therebetween. Second structure is provided for limiting relative radial movement between the rim and the hub and defining an interface between the rim and the hub. The second structure includes oppositely facing surfaces on the rim and the hub at the interface. The interface is characterized by the essential absence of elastomeric material between the surfaces.

In one form of the invention, a radially compliant gear is provided and includes a gear rim rotatable about an axis and a hub mounting the rim for rotation about the axis. The gear rim includes external gear teeth and a first annular flange centered on the axis. The hub includes a second annular flange centered on the axis and overlying the first annular flange to limit radially outward movement of the rim while allowing localized, radially inward deflections of the rim relative to the hub.

Other objects, features, and advantages of the invention will be apparent from the following detailed description taken in connection with the accompanying drawings.

DETAILED DESCRIPTION OF THE PREFERRED EMBODIMENT

Figure 1:
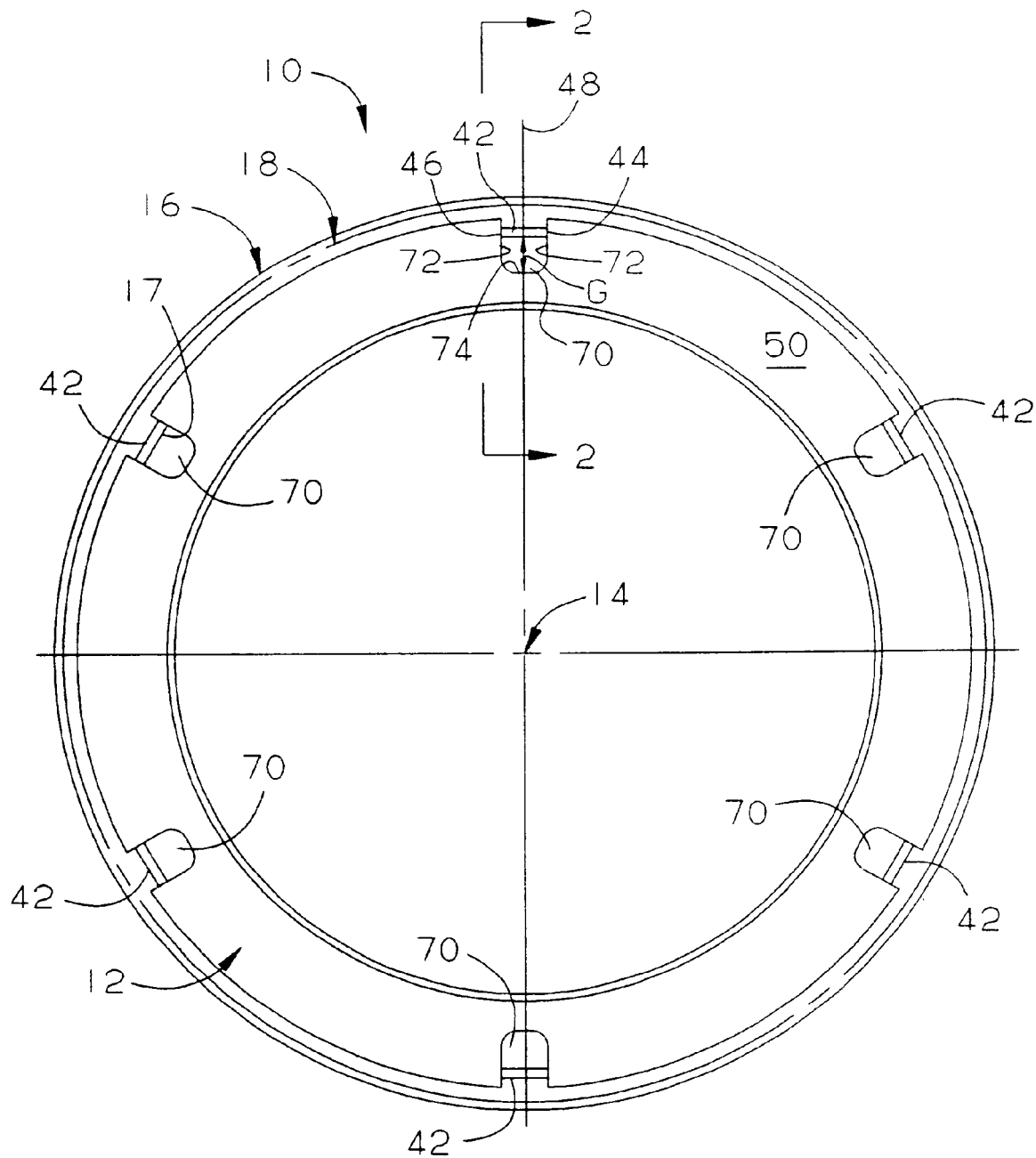
FIG. 1 is a side elevation of a radially compliant gear made according to the invention.

As seen in FIG. 1, a radially compliant gear 10 is provided and includes a hub 12 adapted to rotate about an axis 14, and a radially compliant rim 16 including an inner periphery 17 and external, radially outwardly directed gear teeth 18 (shown schematically in FIG. 1). The hub 12 mounts the rim 16 for rotation about the axis 14.

Figure 2:
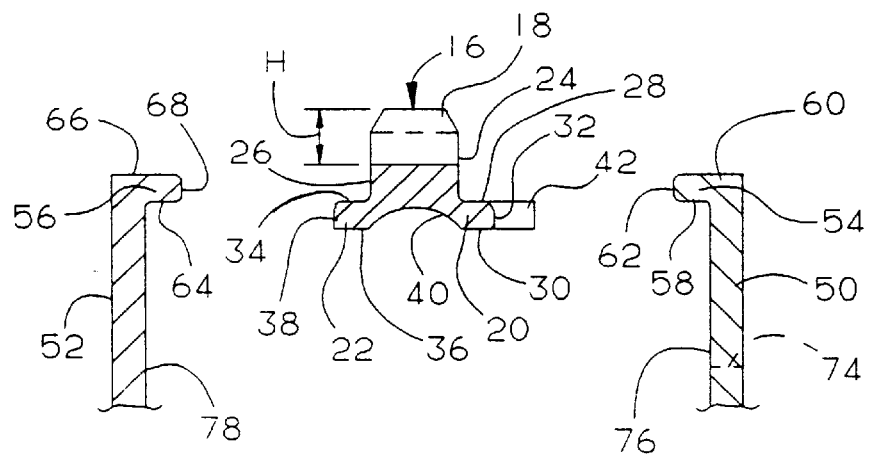
FIG. 2 is an enlarged, exploded sectional view of one embodiment of the gear shown in FIG. 1 taken approximately along line 2—2 in FIG. 1.

As best seen in FIG. 2, the external gear teeth 18 have a tooth height H. The rim 16 further includes a pair of annular flanges 20 and 22 extending axially from opposite faces 24 and 26 of the rim 16. The flange 20 is defined by a radially outwardly facing, cylindrical surface 28 centered on the axis 14; a radially inwardly facing, cylindrical surface 30 centered on the axis 14, and an axial face surface 32. The flange 22 is defined by a radially outwardly facing, cylindrical surface 34 centered on the axis 14; a radially inwardly facing, cylindrical surface 36 centered on the axis 14; and an axial face surface 38. The inner periphery 17 of the rim 16 is defined by the surfaces 30, 36 and a radially inwardly facing, annular surface 40 having an arcuate section. As best seen in FIG. 1, the rim 16 also includes a plurality of equally spaced tabs or torsional drive dogs 42 that extend axially from the face surface 32 of the flange 20. Each of the dogs 42 is defined by parts of the surfaces 28, 30 and a pair of oppositely facing side surfaces 44 and 46 that extend parallel to an imaginary radial line 48 that extends from the axis 14 to bisect the dog 42. Each of the surfaces 44 and 46 also extends parallel to the axis 14.

Figure 3:
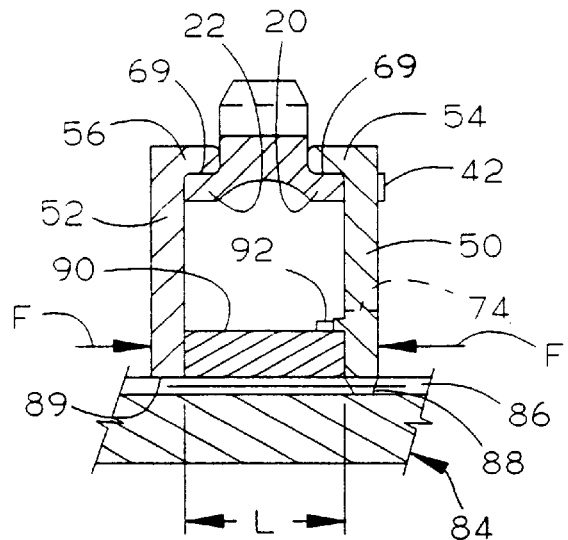
FIG. 3 is an enlarged sectional view of the embodiment in FIG. 2 shown in its assembled state along with some mating components.

As best seen in FIGS. 2 and 3, the hub 12 includes first and second hub pieces 50, 52 on opposite sides of the rim 16. As seen in FIG. 3, the hub pieces 50, 52 include annular flanges 54, 56, respectively, that radially overlay the flanges 20, 22, respectively, to mount the rim 16 for rotation about the axis 14 and to limit or restrict radially outward movement of the rim 16. As best seen in FIG. 2, the flange 54 is defined by a radially inwardly facing, cylindrical surface 58 centered on the axis 14; a radially outwardly facing, cylindrical surface 60 centered on the axis 14; and an axial face surface 62. The flange 56 is defined by a radially inwardly facing, cylindrical surface 64 centered on the axis 14; a radially outwardly facing, cylindrical surface 66 centered on the axis 14; and a axial face surface 68. Thus, the flanges 20,22, 54, 56, and surfaces 28, 34, 58, 64 combine to act as means for limiting the radial displacement of the rim 16 relative to the hub pieces 50, 52 and for defining an interface 69 between the rim 16 and the hub 12.

As seen in FIG. 1, the hub piece 50 further includes a plurality of generally radially extending slots 70 each of which receives one of the dogs 42. Each of the slots 70 is defined by a pair of spaced side surfaces 72 that extend nominally parallel to the imaginary radial line 48 and to the axis 14, and a bottom surface 74 that extends nominally perpendicular to the imaginary line 48 to join the surfaces 72. The surfaces 72 serve to limit the relative angular movement between the hub piece 50 and the rim 16 by engagement with the surfaces 44, 46. The hub pieces 50, 52 further include stiffening webs 76, 78, respectively, that provide increased radial stiffness for the flanges 54, 56 and transfer torque between the flanges 54, 56 and the remainder of the hub pieces 50, 52.

As seen in FIG. 3, in the assembled state, the flanges 54 and 56 radially overlie the flanges 20 and 22, respectively, and the dogs 42 are received in the slots 70. Preferably, the surfaces 28, 58 and 34, 64 have interference fits to provide a predetermined minimum radial preload between the rim and the hub. This preload allows for the radial stiffness of the rim 16 to be supplemented by the radial stiffnesses of the hub pieces 50,52. Preferably, the preload is high enough to achieve a sufficiently large initial stiffness at the gear teeth 18 to prevent gear flexure that will damage the gear tooth roots during normal operation. It is also preferred that the preload be sufficient to prevent radial deflections of the rim 16 relative to the hub 12 in response to the maximum normal tooth operating load anticipated for the gear 10 during normal operation. When a piece of debris, such as a broken tooth, enters gear 10's mesh with another gear, a normal force will be generated at the gear mesh that is sufficient to overcome the predetermined preload and the rim 16 will undergo a localized radial deflection that allows the debris to be driven through the gear mesh without jamming the gear 10. As best seen in FIG. 1, there is a radial gap G between the surface 30 and the surfaces 74 that is greater than the tooth height H of the gear teeth 18. The gap G allows for the relatively low radial stiffness of the rim 16 to accommodate the localized radial deflection after the predetermined preload has been overcome. The exact magnitude of the gap G will be dependent upon, at least in part, the sizes of the jamming debris that are anticipated for the gear 10, and it is preferred that the magnitude of the gap G be large enough to prevent the inner periphery 17 of the rim 16 from contacting the hub when the rim 16 undergoes its maximum anticipated radial deflection.

Preferably, the radial cross-section and thickness of the rim 16, and the interference fits between the surfaces 28, 58 and 34, 64, should be designed to allow the maximum anticipated size of debris to be driven through the gear mesh without exceeding the maximum allowed driving torque through the gear 10. In this regard, it may be preferable in some devices for the rim 16 to undergo permanent deformation after a predetermined amount of localized radial deflection to minimize the loads at the gear mesh. If the anticipated debris is large enough to cause permanent plastic deformation of the rim 16, a second gear 10 may be mounted on a parallel gear train to allow continued operation through the second gear 10. However, in other devices it may be preferred that the rim 16 be designed to undergo its maximum anticipated radial deflection without permanently deforming.

While it is preferred that there be interference fits between the surfaces 28 and 58 and the surfaces 34 and 64, it should be understood that if there are no interference fits, the engagement of the dogs 42 and the slots 70 can be sufficient to mount the rim 16 to the hub 12 for rotation about the axis 14. More specifically, because there are at least three spaced mating dogs 42 and slots 70, the rim 16 can be accurately located and mounted with respect to the axis 14 by the hub 12, even in the absence of contact between the surfaces 28 and 58 and the surfaces 34, 56 and 64. In this regard, the closer the fit between the surfaces 44, 46 on the dogs 42 and the surfaces 72 of the slots 70, the more accurate the radial location of the rim 16 to the hub 12. Accordingly, in one embodiment of the gear 10, there is no interference fit between the surfaces 28 and 58 and the surfaces 34 and 64. In this embodiment, the rim is located radially and mounted to the hub 12 through the engagement of the dogs 42 and the slots 70. It should be noted that in this embodiment there is no predetermined radial preload and the rim will deflect relative to the hub even under normal operating loads.

While there are many possible ways to provide the gear 10 in its assembled state, one preferred construction is shown in FIG. 3. In this construction, the gear 10 is intended for use with a shaft 84 having an external spline 86. The hub piece 50 is provided with an internal spline 88 that mates with the external spline 86 to transfer torque between the gear 10 and the shaft 84. The hub piece 52 is provided with an inner cylindrical surface 89 that is accurately piloted on the outside diameter of the spline 86. A spacer 90 is provided between the hub pieces 50 and 52 adjacent the outside diameter of the spline 86, and is accurately piloted on the outside diameter of the spline 86. An annular locating flange 92 is provided on the hub piece 50, and is accurately piloted on the spacer 90 to accurately locate the hub piece 50 relative to the shaft 84 and the axis 14. The gear 10 is maintained in its assembled state by clamping through the hub pieces 50, 52 and the spacer 90, as shown by the clamp forces F in FIG. 3. The spacer 90 has a length that prevents clamping at the surfaces 32, 38, 62, 68, while allowing the surfaces 32, 38, 62, 68 to guide and accurately center the rim 16 relative to the hub 12.

Figure 4:
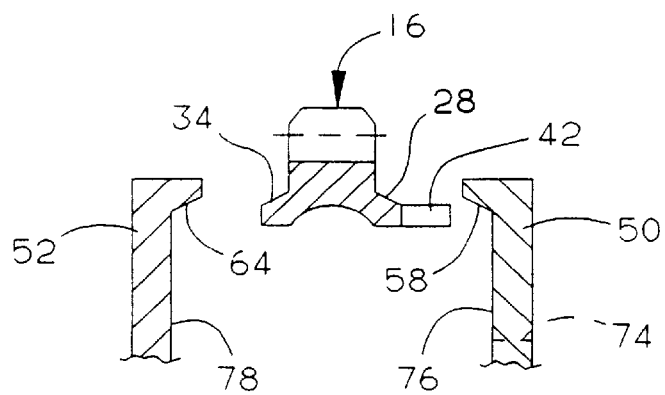
FIG. 4 is an enlarged, exploded sectional view similar to that of FIG. 2, but of another embodiment of the invention.

FIG. 4 illustrates a second embodiment of the gear 10 wherein the rim 16 and the hub pieces 50, 52 are identical to those shown in FIGS. 2 and 3, except for the surfaces 28, 34, 58 and 64 which are conical in FIG. 3 rather than cylindrical. The conical surfaces allow the desired predetermined minimum radial preload to be automatically generated during assembly when the rim 16 is clamped between the hub pieces 50 and 52 by the forces F. It should be understood that the construction in FIG. 3 can also be utilized for the embodiment of the gear 10 shown in FIG. 4.

Figure 5:
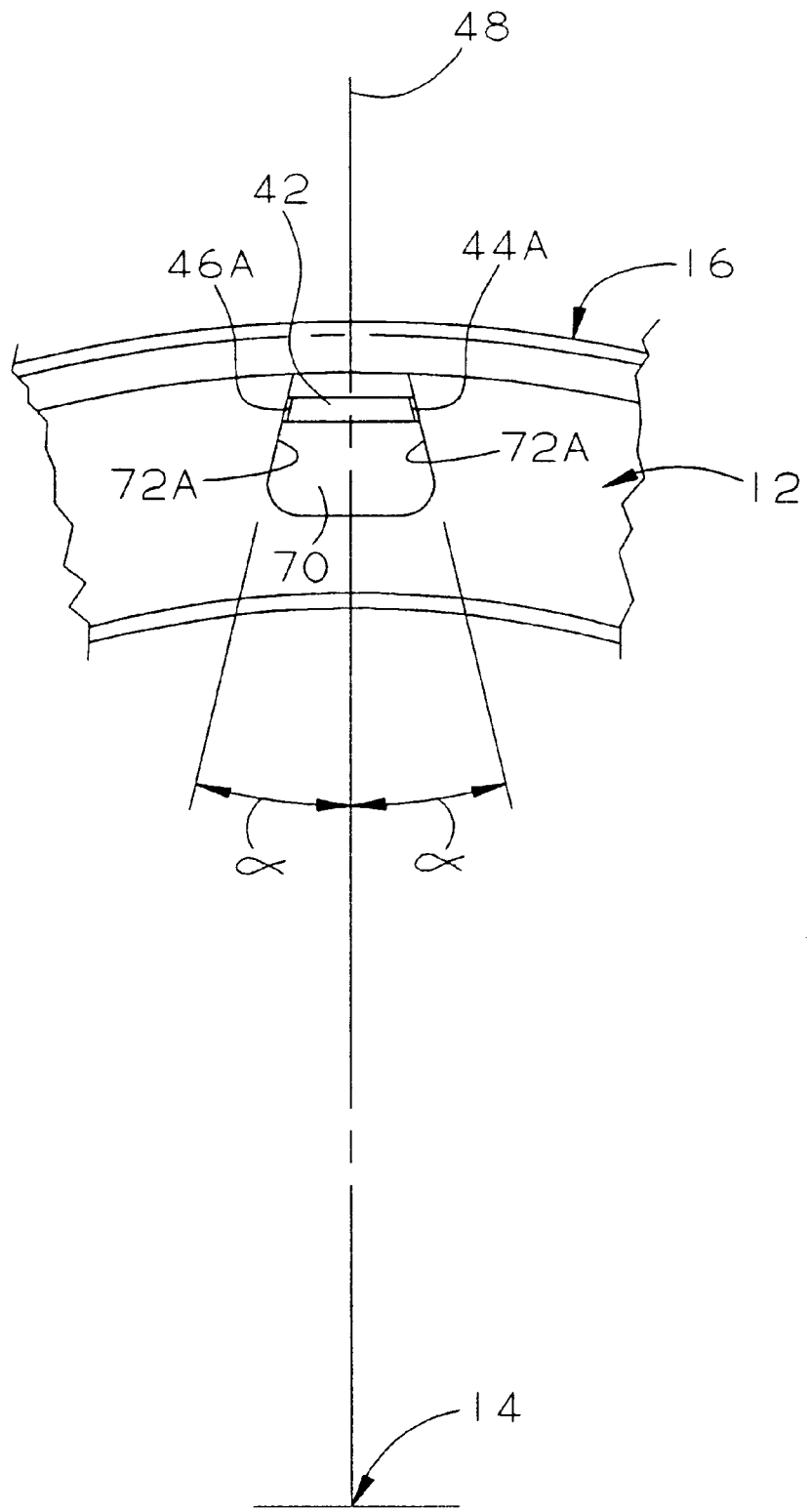
FIG. 5 is an enlarged, fragmentary view similar to that of FIG. 1, but of another embodiment of the invention.

FIG. 5 illustrates an alternate embodiment for the dogs 42 and the slots 70. In this embodiment, each of the dogs 42 is defined by parts of the surfaces 28, 30 and a pair of oppositely facing side surfaces 44A and 46A that extend at an angle α relative to the imaginary radial line 48 so that the surfaces 44A, 46A are parallel with and face away from the axis 14. Similarly, each of the slots 70 is defined by a pair of oppositely facing side surfaces 72A that extend at the angle α relative to the imaginary radial line 48 so that the surfaces 72A are parallel with and face toward the axis 14. When a piece of debris enters the gear 10's mesh with another gear, engagement of the either of the surfaces 44A and 46A with the surfaces 72A produces radially inward forces on the rim 16 which help to deflect the rim 16 radially inwardly to accommodate the debris, thereby serving to reduce the torque required to drive the debris through the mesh. In one preferred embodiment, the angle α is selected so that the engagement of the surfaces 44A, 46A, 72A produces radially inward forces that are sufficient to overcome the frictional forces between the surfaces 44A, 46A, 72A that tend to resist radially inward deflections of the rim 16. It should be understood that the embodiment of the dogs 42 and the slots 70 shown in FIG. 5 may be employed with any of the embodiments of the gear 10 described herein, including an embodiment where the dogs 42 and the slots 70 serve to mount the rim 16 to the hub 12 for rotation about the axis 14 in the absence of interference fits between the surfaces 28, 58 and 34, 64.

It should be understood that, for the construction shown in FIG. 3, additional dogs 42 and mating slots 70 could be provided on the flange 22 and the hub piece 52 along with a spline 88 on the hub piece 52 for transferring torque between the shaft 84 and the rim 16. However, because it would be difficult to ensure an equal load split of the torque between the two hub pieces 50 and 52, it is generally preferred to employ the dogs 42 and slots 70 only in connection with the hub piece 50 for the construction shown in FIG. 3.

It should further be appreciated that the rim 16 may be constructed in a multitude of configurations to provide the desired radial compliance and/or preload for a particular application.

It should be appreciated that the two piece hub 12 provides stable centering of the rim 16 while allowing the rim 16 to undergo a localized radial deflection as a result of a jam. It should also be appreciated that the gear 10 allows for the teeth 18 to take advantage of the combined stiffness of the rim 16 and the hub 12 by providing for a predetermined radial preload between the rim 16 and the hub 12. This allows the gear 10 to be designed to prevent fatigue of the gear teeth 18 at the roots, while still having sufficient radial compliance after the preload is overcome to allow debris to be driven through the gear mesh without jamming the gear 10.

It should further be appreciated that the unique construction of the gear 10 allows for the radially compliant rim 16 to be mounted to the hub 12 at the interface 69, without using any elastomeric material at the interface 69 that is essential to the operation of the gear 10. Thus, in one preferred embodiment, the interface 69 is characterized by the essential absence of elastomeric material between the surfaces 28 and 58 and the surfaces 34 and 64.

It should also be appreciated that, because of its ability to absorb shock loads through radial deflections of the rim 16 relative to the hub 12, the radially compliant gear 10 can increase the shock load tolerance of a mechanical power transmission device by minimizing the shock loads transmitted through the device.

We claim:

1. A radially compliant gear comprising:

a hub adapted to rotate about an axis, the hub including a first surface that faces radially inwardly; and a rim including external gear teeth and a second surface that faces radially outwardly, the rim mounted to the hub through the first and second surfaces to allow localized radial deflections of the rim relative to the hub, the first and second surfaces being configured to provide a predetermined minimum radial preload between the rim and the hub.

2. The gear of claim 1 wherein the second surface has an interference fit with the first surface to provide the predetermined minimum radial preload between the rim and the hub.

3. The gear of claim 1 wherein the first and second surfaces are cylindrical surfaces.

4. The gear of claim 1 wherein the first and second surfaces are conical surfaces.

5. The gear of claim 1 wherein the hub further includes a third surface that faces inwardly toward the axis, and the rim further includes a fourth surface that faces outwardly away from the axis, and has an interference fit with the third surface to contribute to the predetermined minimum radial preload between the rim and the hub.

6. The gear of claim 5 wherein the second and fourth surfaces are located on opposite axial sides of the rim.

7. The gear of claim 1 wherein the hub includes a first piece and a second piece that are located on opposite axial sides of the rim to retain the rim therebetween.

8. The gear of claim 1 further comprising:

a plurality of stop surfaces on the hub; and a plurality of stop surfaces on the rim engageable with the stop surfaces on the hub to transmit torque between the rim and the hub.

9. A radially compliant gear comprising:

a rim including external gear teeth; and first and second hub pieces spaced from each other on opposite sides of the rim to mount the rim for rotation about an axis, a portion of each of the hub pieces radially overlaying a corresponding portion of the rim to restrict radially outward movement of the rim.

10. The radially compliant gear of claim 9 wherein each of the corresponding portions of the rim includes a surface that faces outwardly away from the axis, and each of the hub portions includes a surface that faces inwardly toward the axis overlying the outwardly facing surface of the corresponding rim portion.

11. The radially compliant gear of claim 10 wherein the surfaces are configured to provide a predetermined minimum radial preload between the rim and the hub.

12. The radially compliant gear of claim 11 wherein the inwardly facing surface of each hub portion has an interference fit with the outwardly facing surface of the corresponding rim portion.

13. The radially compliant gear of claim 10 wherein the surfaces are cylindrical surfaces.

14. The radially compliant gear of claim 10 wherein the surfaces are conical surfaces.

15. A radially compliant gear comprising:

a hub adapted to rotate about an axis, the hub including at least three pairs of guide surfaces spaced angularly from each other relative to the axis, the guide surfaces of each pair extending parallel to an imaginary radial line extending outward from the axis; and a rim including gear teeth and at least three pairs of mating surfaces spaced angularly from each other about the axis, the mating surfaces of each pair extending parallel to an imaginary radial line extending outward from the axis, the mating surfaces engaging the guide surfaces to radially locate and mount the rim to the hub for rotation about the axis and to transmit torque between the rim and the hub while allowing localized radial deflections of the rim relative to the hub.

16. The radially compliant gear of claim 15 wherein the pairs of mating and guide surfaces are defined by mating pairs of slots and tabs on the rim and the hub.

17. The radial compliant gear of claim 16 wherein all of the slots are on the hub, and all of the tabs are on the rim.

18. A radially compliant gear comprising:

a gear rim having radially outwardly directed teeth;

a hub rotatable about an axis and mounting said gear rim for both relative angular movement and relative radial movement thereon;

means on said hub and said rim for limiting relative angular movement therebetween; and means for limiting relative radial movement between said rim and said hub and defining an interface between said rim and said hub, said means including oppositely facing surfaces on said rim and said hub at said interface, said interface being characterized by the essential absence of elastomeric material between said surfaces.

19. The radially compliant gear of claim 18 wherein one of said surfaces is a cylindrical surface on the rim that faces outwardly away from said axis, and one of said surfaces is a cylindrical surface on said hub that faces inwardly toward said axis.

20. The radially compliant gear of claim 18 wherein one of said surfaces is a conical surface on said rim that faces outwardly away from said axis, and one of said surfaces is a conical surface on said hub that faces inwardly toward said axis.

21. The radially compliant gear of claim 18 wherein said oppositely facing surfaces are configured to produce a predetermined minimum radial preload through said interface.

22. A radially compliant gear comprising:

a gear rim rotatable about an axis, the gear rim including external gear teeth and a first annular flange centered on the axis;

a hub mounting the gear rim for rotation about the axis, the hub including a second annular flange centered on the axis and overlying the first annular flange to limit radially outward movement of the rim while allowing localized, radially inward deflections of the rim relative to the hub.

23. The radially compliant gear of claim 22 wherein the first and second flanges are interference fit to produces a predetermined minimum radial preload between the rim and the hub.

24. The gear of claim 22 further comprising:

a plurality of stop surfaces on the hub; and a plurality of stop surfaces on the rim engageable with the stop surfaces on the hub to transmit torque between the rim and the hub.

25. The gear of claim 24 wherein the stop surfaces on the hub and the rim are configured to produce radially inward forces on the rim that are sufficient to overcome frictional forces between the surfaces that resist radially inward deflections of the rim relative to the hub with the stop surfaces engaged to transmit torque.

* * * * *